(12) United States Patent
M'Sadoques et al.

(10) Patent No.: US 8,593,024 B2
(45) Date of Patent: Nov. 26, 2013

(54) IMPLEMENTATION OF A NON-METALLIC BARRIER IN AN ELECTRIC MOTOR

(75) Inventors: George A. M'Sadoques, Granby, MA (US); Michael R. Carra, Enfield, CT (US); Durwood M. Beringer, Suffield, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 409 days.

(21) Appl. No.: 12/758,353

(22) Filed: Apr. 12, 2010

(65) Prior Publication Data

US 2011/0248586 A1    Oct. 13, 2011

(51) Int. Cl.
    *H02K 5/128* (2006.01)
(52) U.S. Cl.
    USPC .............................. 310/86; 310/88
(58) Field of Classification Search
    USPC ........................................ 310/86, 88
    See application file for complete search history.

(56) References Cited

U.S. PATENT DOCUMENTS

| | | | | |
|---|---|---|---|---|
| 2,730,636 | A | * | 1/1956 | Dunn .............................. 310/86 |
| 3,031,973 | A | | 5/1962 | Kramer |
| 3,229,130 | A | * | 1/1966 | Drouard .......................... 310/54 |
| 4,808,087 | A | | 2/1989 | Tsutsui et al. |
| 5,256,038 | A | | 10/1993 | Fairman |
| 5,385,454 | A | | 1/1995 | Kobayashi et al. |
| 5,601,493 | A | * | 2/1997 | Nakazono et al. ............ 464/181 |
| 5,692,886 | A | | 12/1997 | Kobayashi et al. |
| 6,417,591 | B1 | * | 7/2002 | Saito et al. .................... 310/104 |
| 6,814,549 | B2 | | 11/2004 | Kimberlin et al. |
| 6,884,043 | B2 | | 4/2005 | Kimberlin et al. |
| 6,948,919 | B2 | * | 9/2005 | Roslund et al. ............ 417/423.7 |
| 2003/0160527 | A1 | | 8/2003 | Kimberlin et al. |

FOREIGN PATENT DOCUMENTS

| | | |
|---|---|---|
| JP | 07-035074 | 2/1995 |
| JP | 2001231213 | 8/2001 |
| JP | 2002136046 | 5/2002 |
| JP | 2002165411 | 6/2002 |

OTHER PUBLICATIONS http://water.usgs.gov/nawqa/vocs/oxybib/index.oxybib.html, May 2009.*
Murakami et al, JP2001231213 Machine Translation, Aug. 2001.*

* cited by examiner

*Primary Examiner* — Burton Mullins
*Assistant Examiner* — Eric Johnson
(74) *Attorney, Agent, or Firm* — Carlson, Gaskey & Olds, PC

(57) ABSTRACT

A motor for use in a volatile environment includes a rotor exposed to the volatile environment, electronics for rotating the rotor, an impervious ceramic barrier separating the electronics and the rotor, and a flexible seal for preventing the volatile environment from contacting the electronics and for minimizing vibratory and twisting loads upon the barrier to minimize damage to the barrier.

19 Claims, 1 Drawing Sheet

US 8,593,024 B2

IMPLEMENTATION OF A NON-METALLIC BARRIER IN AN ELECTRIC MOTOR

This invention was made with government support under Contract No. RH6-118203 awarded by NASA. The Government has certain rights in this invention.

BACKGROUND

Some electric motors are "canned" or sealed using a metallic barrier to prevent an environment in which the motor is used from entering into the electrical portion of the motor. Such environments may include a fluid like a liquid or a gas. In running in volatile environments such as higher concentrations of oxygen, the volatile environment must be sealed from the electronics to prevent any sparks from interacting with the oxygen.

SUMMARY

According to an exemplar, a motor for use in a volatile environment includes a rotor exposed to the volatile environment, electronics for rotating the rotor, an impervious ceramic barrier separating the electronics and the rotor, and a flexible seal for preventing the volatile environment from contacting the electronics and for minimizing vibratory and twisting loads upon the barrier to minimize damage to the barrier.

A frangible barrier is disposed between a rotor and the electronics the rotor being disposed in a volatile atmosphere. The frangible barrier is supported by a set of O-rings that also act as seals to prevent the environment from reaching the motor electronics.

These and other features of the present invention can be best understood from the following specification and drawings, the following of which is a brief description.

DETAILED DESCRIPTION OF THE PREFERRED EMBODIMENT

Figure 1:
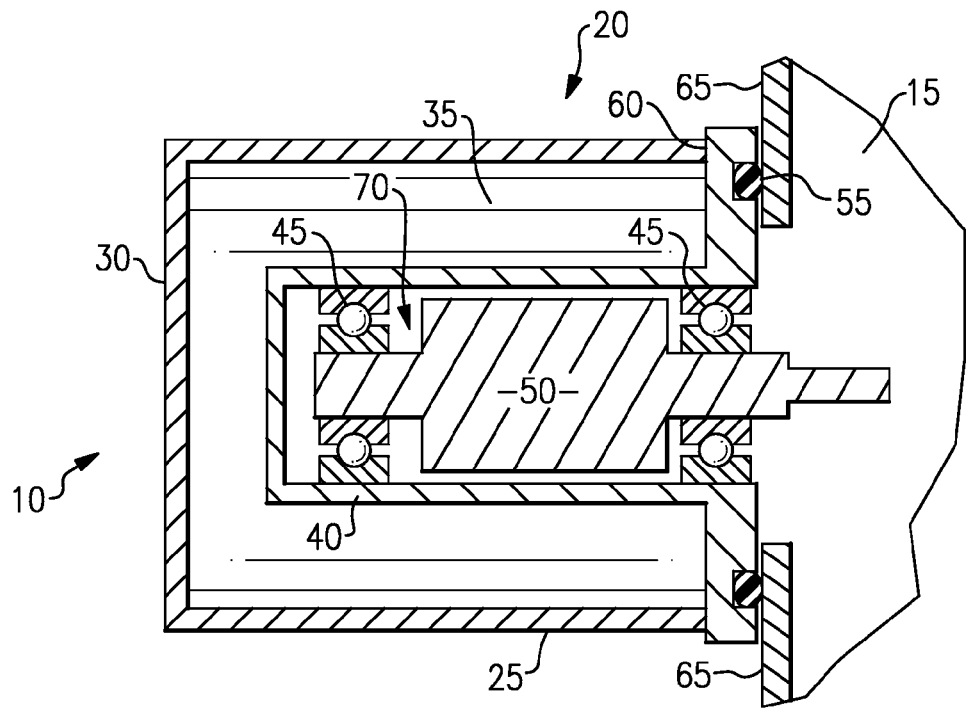
FIG. 1 shows a prior art embodiment of a canned electric motor.

Referring to FIG. 1, a prior art example of a motor 10 used in an oxygen-rich environment 15 is shown. The motor 10 includes housing 20, having a cylindrical body 25 with an end seal 30. The housing 20 holds electronics 35 (such as controls and stator windings etc.) in which electricity is used. An electrically conductive canning material 40, such a metal, is used to create a recess 70 in which a plurality of bearings 45 hold a rotor 50. The canning material 40 is attached conventionally to the housing 20 at an open end 60 of the cylinder 25 and to an environment wall 65. An O-ring 55 is disposed between the housing 20 and the environmental wall 65 to prevent the environment from leaking outside the motor 10. The continuous canning material 40 seals the oxygen from reaching the electronics 35. Unfortunately this metal canning reduces the motor efficiency as its speed is increased. For example, higher currents in the motor 10 can induce eddy currents in the canning material 40. The eddy currents in the canning material 40 may interfere with magnetic flux between the rotor 50 and electronics 35, resulting in drag forces and heating as electrical current is increased in the motor 10.

Figure 2:
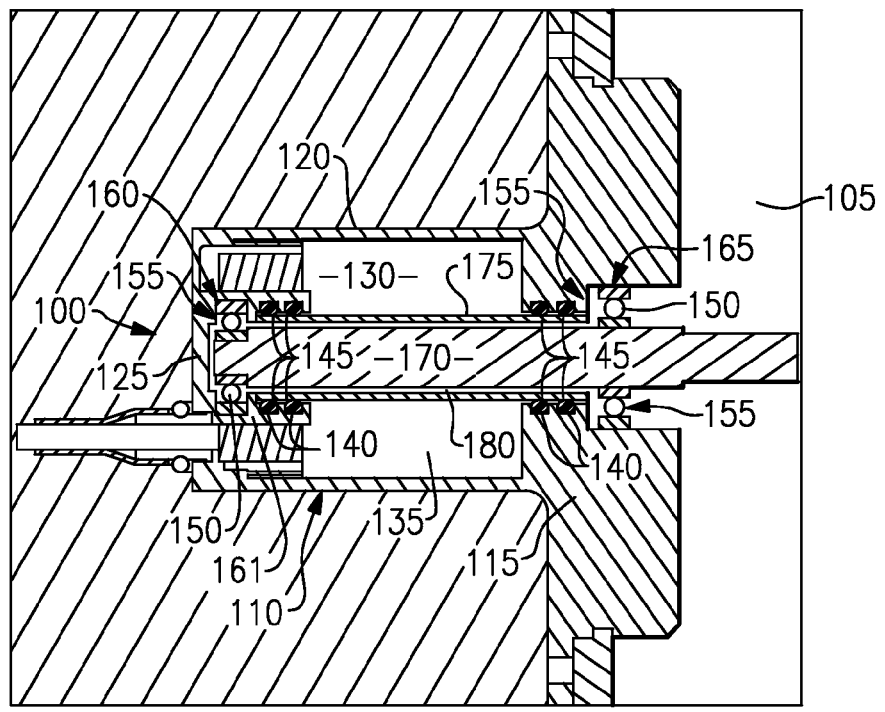
FIG. 2 shows an embodiment of an electric motor with a non-metallic barrier in a volatile environment.

Referring now to FIG. 2 a motor 100 is shown in a volatile environment 105, such as a 100% oxygen environment of a space suit, though other volatile fluid mixtures in other locations are also contemplated herein as volatile environments. A housing 110 extends into the environment via a radially outboard portion 115. The housing 110 also includes a cylindrical portion 120 closed off by end portion 125. The interior 130 of the cylinder houses electronics 135 (like windings and controls) or the like. The housing 110 has a set of four radial grooves 140 that hold O-rings 145, which may be made of silicone, or the like, as will be discussed herein below.

The motor has a bearing set 150 disposed in races 155 at an inboard portion 160, the races 155 disposed within a circular flange 161 extending inboard from the end portion 125 (as shown in FIG. 2) and a radially outboard portion 165 to hold a rotor 170 that is disposed for rotation within the bearing sets 150. A non-metallic barrier 175, which may be frangible, thin, non-metallic, non-magnetic, ceramic material shaped like a cylinder is disposed within the O-rings 145. Other shapes may be contemplated herein. The rotor 170 is configured for exposure to the volatile environment 105, as a gap 180 exists between the rotor 170 and the non-metallic barrier 175. The barrier 175 is isolated from the housing 20 by the o-rings 144.

By providing a very thin non-metallic bather 175 made of an impervious ceramic material, the efficiency of the motor 100 is greatly improved because interference with magnetic fluxes between the rotor 170 and electronics 135 is minimized. The ceramic material for the non-metallic barrier 175 is used because non-metallic materials do not rust or burn in an oxygen rich or pure oxygen environment and are anti-magnetic. Though an embodiment uses stabilized zircona as the ceramic material, other morpheus and amorphous glasses and crystals such as sapphire, alumina, or the like may also be used.

The non-metallic barrier 175 thickness may be approximately 0.025 inches (0.635 mm) thick and made of a ceramic material like a glass, as stated above, and such glass tends to be brittle. Motors for certain applications, like space exploration, may be subject to high vibrational and torquing environments. The O-rings 145 act as flexible seals to protect the ceramic material of the non-metallic barrier 175 from deflection within the motor 100 due to bending or twisting, or from vibration and shocks that may shatter a glass barrier in a rigidly mounted configuration. The compliance of the O-rings 145 gently constrains the non-metallic barrier 175 and isolates it from the harsh external motor environment. The combination of the O-rings 145 and the non-metallic barrier 175 isolate the electronics 135 from the volatile environment 105 to which the rotor 170 may be exposed.

While glass is contemplated herein other frangible materials that do not interfere with the magnetic flux between the rotor and the stator of a motor are here also contemplated.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A motor for use in a volatile environment, said motor comprising;
   a housing having an inboard end portion and an outboard end portion, said outboard end portion extending into said volatile environment,
   a rotor configured for exposure to said volatile environment and disposed in said housing, said rotor supported for rotation within said housing in an inboard set of bearings supported by said housing at said inboard end portion and an outboard set of bearings supported by said housing at said outboard end portion, said outboard set of bearings disposed within said volatile environment,
   electronics for rotating said rotor,
   an impervious ceramic barrier separating said electronics and said rotor, and
   a first flexible seal, said first flexible seal disposed axially outward from said inboard set of bearings and a second flexible seal disposed axially inward from said outboard set of bearings, said first flexible seal and said second flexible seal preventing said volatile environment from contacting said electronics and minimizing vibratory and twisting loads upon said ceramic barrier to minimize damage to said ceramic barrier wherein said ceramic barrier is isolated from said housing.

2. The motor of claim 1 wherein said volatile environment is oxygen.

3. The motor of claim 1 wherein said ceramic barrier is a glass.

4. The motor of claim 3 wherein said glass is made from one of zirconia or alumina.

5. The motor of claim 1 wherein said ceramic barrier is impervious to said volatile environment.

6. The motor of claim 1 wherein said ceramic barrier is non-magnetic.

7. The motor of claim 6 wherein said ceramic barrier is non-metallic.

8. The motor of claim 1 wherein said inboard set of bearings is disposed within a circular flange extending axially outward from said inboard end of said housing.

9. The apparatus of claim 1 wherein said ceramic barrier is frangible.

10. The motor of claim 1 wherein both the first and second flexible seals are axially inward from said second outboard set of bearings.

11. The motor of claim 10 wherein both the first and second flexible seals are axially outward from said first inboard set of bearings.

12. An apparatus for use in a volatile environment, said apparatus comprising;
   a housing having an inboard end portion and an outboard end portion, said outboard end portion extending into said volatile environment,
   a rotor configured for exposure to said volatile environment and disposed in said housing, said rotor supported for rotation within said housing in an inboard set of bearings supported by said housing at said inboard end portion and an outboard set of bearings supported by said housing at said outboard end portion, said outboard set of bearings disposed within said volatile environment,
   electronics for rotating said rotor,
   an impervious ceramic barrier separating said electronics and said rotor, and
   a pair of flexible seals, a first flexible seal disposed axially outward from said inboard set of bearings and a second flexible seal disposed axially inward from said outboard set of bearings, said first flexible seal and said second flexible seal preventing said volatile environment from contacting said electronics and minimizing vibratory and twisting loads upon said ceramic barrier to minimize damage to said ceramic barrier and wherein said ceramic barrier does not contact said housing.

13. The apparatus of claim 12 wherein said volatile environment is oxygen.

14. The apparatus of claim 12 wherein said ceramic barrier is a glass.

15. The apparatus of claim 14 wherein said glass is made from one of zirconia or alumina.

16. The apparatus of claim 12 wherein said ceramic barrier is impervious to said volatile environment.

17. The apparatus of claim 12 wherein said ceramic barrier is non-magnetic.

18. The apparatus of claim 17 wherein said ceramic barrier is non-metallic.

19. A motor for use in a volatile environment, said motor comprising;
   a housing having an inboard end portion and an outboard end portion, said outboard end portion extending into said volatile environment,
   a rotor configured for exposure to said volatile environment and disposed in said housing, said rotor supported for rotation within said housing in an inboard set of bearings supported by said housing at said inboard end portion and an outboard set of bearings supported by said housing at said outboard end portion, said outboard set of bearings disposed within said volatile environment,
   electronics for rotating said rotor,
   an impervious ceramic barrier separating said electronics and said rotor wherein said ceramic barrier is made of a glass ceramic that is approximately 0.635 mm thick, and,
   a first flexible seal, said first flexible seal disposed axially outward from said inboard set of bearings and a second flexible seal disposed axially inward from said outboard set of bearings, said first flexible seal and said second flexible seal preventing said volatile environment from contacting said electronics and minimizing vibratory and twisting loads upon said ceramic barrier to minimize damage to said ceramic barrier.

* * * * *